United States Patent
Renzo

(10) Patent No.: US 7,670,535 B2
(45) Date of Patent: Mar. 2, 2010

(54) METHOD FOR MAKING A CASING WITH PROTECTIVE BELLOWS FOR TRANSMISSION DEVICE AND CASING OBTAINED BY SAID METHOD

(75) Inventor: Bernard Renzo, Nantes (FR)

(73) Assignee: RZ Engineering, Nantes (FR)

( * ) Notice: Subject to any disclaimer, the term of this patent is extended or adjusted under 35 U.S.C. 154(b) by 710 days.

(21) Appl. No.: 10/538,648

(22) PCT Filed: Dec. 10, 2003

(86) PCT No.: PCT/FR03/03653

§ 371 (c)(1),
(2), (4) Date: Dec. 6, 2005

(87) PCT Pub. No.: WO2004/062895

PCT Pub. Date: Jul. 29, 2004

(65) Prior Publication Data

US 2006/0166750 A1    Jul. 27, 2006

(30) Foreign Application Priority Data

Dec. 13, 2002  (FR) ................... 02 15850

(51) Int. Cl.
*B29B 7/00* (2006.01)
(52) U.S. Cl. .................... 264/328.1; 464/175
(58) Field of Classification Search ................ 264/318, 264/328.1, 334; 425/577, DIG. 58; 249/59; 464/175, 906; 277/635, 634; 285/224, 226
See application file for complete search history.

(56) References Cited

U.S. PATENT DOCUMENTS

| 2,049,100 | A | * | 7/1936 | Baker ............................ 92/45 |
| 2,432,803 | A | * | 12/1947 | Rice ............................ 464/175 |
| 3,096,104 | A | * | 7/1963 | Browning .................... 285/226 |
| 3,151,894 | A | * | 10/1964 | Wilson et al. ............ 285/142.1 |
| 4,844,486 | A |   | 7/1989 | Schiemann |
| 4,852,891 | A | * | 8/1989 | Sugiura et al. .............. 464/175 |
| 4,988,113 | A |   | 1/1991 | Chaczyk |
| 5,006,376 | A |   | 4/1991 | Arima et al. |
| 6,461,695 | B1 | * | 10/2002 | Schaap ....................... 428/34.1 |
| 6,937,316 | B2 | * | 8/2005 | Kemper et al. ................ 355/30 |

FOREIGN PATENT DOCUMENTS

| DE | 295 19 333 | | 1/1997 |
| EP | 565344 | A2 * | 10/1993 |
| EP | 0 647 790 | | 4/1995 |
| FR | 2 596 693 | | 10/1987 |
| FR | 2 606 849 | | 5/1988 |

* cited by examiner

*Primary Examiner*—Aaron M Dunwoody
(74) *Attorney, Agent, or Firm*—Young & Thompson

(57) ABSTRACT

A method for making a casing (1) with protective bellows (2, 2A) for transmission device, such as a transmission joint, includes at least two shafts mobile axially and/or at an angle relative to each other, the casing (1) with bellows (2, 2A), whereon at least part of the bellows (2') are radial, having at each open end a section (3A, 3B) for being fixed to the transmission device. The method includes moulding the casing (1) with bellows (2, 2A), using a hollow mould and at least one core, having each at least a matching helical thread delimiting the moulding space and stripping the casing (1) formed by relatively unscrewing the casing (1) and the core to obtain a single-piece casing (1). The invention is applicable to a casing with bellows by arrangement of extensible or flexible coupling elements.

3 Claims, 3 Drawing Sheets

METHOD FOR MAKING A CASING WITH PROTECTIVE BELLOWS FOR TRANSMISSION DEVICE AND CASING OBTAINED BY SAID METHOD

CROSS-REFERENCE TO RELATED APPLICATIONS

The present application claims priority to and incorporates by reference PCT/FR03/03653 filed Dec. 10, 2003 and French Patent Application 0215850 filed Dec. 13, 2002.

STATEMENT REGARDING FEDERAL SPONSORED RESEARCH AND DEVELOPMENT

None.

THE NAMES OF PARITIES TO A JOINT RESEARCH PROJECT

None.

INCORPORATION BY REFERENCE OF MATERIAL SUBMITTED ON COMPACT DISC

None.

BACKGROUND OF THE INVENTION

1. Field of the Invention

The present invention relates to a process for the production of a casing with protective bellows for a transmission device, such as a transmission joint, comprising at least two shafts movable axially and/or angularly relative to each other, this casing with bellows, for which at least one portion of the bellows is radial, having at each open end a securement section to the transmission device, as well as a casing with protective bellows obtained particularly by the practice of this process.

2. Description of the Related Art

Different systems for the transmission of movement of a drive shaft to a driven shaft are at present used, preferably with a cardan joint, in particular in the automotive industry in which more and more uses had, for the drive of the wheels from the motor, to devices with homokinetic joints. In such joint devices, a mechanical assembly is lubricated permanently by a mass of grease which is enclosed in a protective bellows. The latter must be able on the one hand to deform elastically in several directions and on the other hand to keep its properties despite multiple causes for damage which can arise in the course of the life of the vehicle. Thus, it has been known for a long time that damage to the bellows is due in particular to the shocks arising from projections of road paving particles which give rise to fissures in the elastomeric material used, or to friction of the elements of the bellows against each other.

There exists in the prior art two types of casings with bellows, namely, on the one hand, casings with protective bellows whose bellows are so-called axial, as shown in FIG. 2, so as to permit essentially a small axial deformation of said bellows, on the other hand casings with radial bellows (FIG. 1) permitting radial, axial or angular displacements of the transmission device. In the case of axial bellows, the wall of the envelope is formed by undulations or holes whose flanks extend substantially parallel to the longitudinal axis of said casing (see FIG. 2). This type of casing has the advantage of being easy to produce because of the absence of counter-clearances. Thus, for this type of casings with bellows, numerous production techniques can be used. However, casings with bellows most often used nowadays are shown in FIG. 1 because of their possibilities for deformation. In this case, at least a portion of the bellows of said casing are radial. In the second family of casings with bellows, the body of the casing, constituted by a tubular body disposed about an axis longitudinal of said casing, is delimited by an undulant wall whose flanks of the folds extend substantially in an essentially radial direction relative to the longitudinal axis of said wall. This arrangement of folds of the bellows permits both an axial and an angular deformation of the bellows, rendering such casings with bellows applicable to a large number of transmission mechanisms.

To permit optimum deformation of such a casing with bellows, these casings have for a long time been produced by molding or injection of vulcanized rubber. However, because of the low mechanical resistance of rubber, the producers have sought to replace rubber with materials of greater rigidity characteristics. As a result, the usual technique applicable to rubber had been replaced by injection/blowing techniques such as described in French patent 2.610.566. In addition to the blow injection technique described in French patent 2.610.566, other blowing techniques have been developed. Thus, generally and as shown in French patent 2.606.849, during production, the molding material, constituted by a thermoplastic elastomeric tube in a pasty condition, is blown. The thermoplastic elastomer presses itself against the cold walls of the mold which represent the external surface of the bellows. Upon opening, the two parts of the mold release the obtained bellows. This blowing process represents a complicated and costly mode of production which is not yet perfected from a point of view of quality. Thus, the correct distribution of thickness of material along the bellows is difficult to obtain because it depends on a number of factors. As a result, there is required on the one hand the use of an excess of material so as to guarantee minimum thickness, on the other hand to provide unitary monitoring of the pieces.

There are thus sought nowadays processes permitting the production of casings with bellows having radial bellows with substantial counter-clearances and made of a relatively rigid material, in particular to resist high temperatures and to increase the mechanical resistance of said casing.

BRIEF SUMMARY OF THE INVENTION

An object of the present invention is thus to provide a process for the production of a casing with bellows whose use permits the production by injection of a casing with bellows having radial bellows of any shape, said casing being obtained from a material of any rigidity adapted to resist in particular high temperatures and adapted to have substantial mechanical resistance.

Another object of the present invention is to provide a casing with bellows whose design permits radial, axial and/or angular deformations of the bellows without decreasing the lifetime of said casing.

To this end, the invention has for its object a process for the production of a casing with protective bellows for a transmission device, such as a transmission joint, comprising at least two shafts movable axially and/or angularly relative to each other, this casing with bellows, of which at least a portion of the bellows are radial, having at each open end a section for securement to the transmission device, characterized in that it consists in molding the casing with bellows, with the help of a hollow mold and at least one core, each having at least one helicoidal complementary screw thread delimiting the molding space, and in demolding the formed casing by relative unscrewing of the casing and the core so as to obtain a single piece casing.

Thanks to the process of production of the casing which comprises a step of unmolding in the course of which, after opening the hollow mold, there takes place a demolding of the casing by relative unscrewing of the casing and the core, there results the possibility of producing casings with protective bellows of which at least one portion of the bellows is radial, the material used being able to be a material of high rigidity, the bellows being able to take any shape.

The invention also has for its object a casing with protective bellows for a transmission device, such as a transmission joint, comprising at least two shafts movable axially and/or angularly relative to each other, this casing with bellows, of which at least one portion of the bellows is radial, having at each open end a section for securement to the transmission device, said casing being preferably obtained by the use of the mentioned process, characterized in that it is present in the form of a single piece body without an internal axial joint plane, at least one portion of the bellows being of helicoidal arrangement, the securement section of larger dimension having a section for passage greater than or equal to the diameter delimited by the summit of the bellows of largest dimension.

DESCRIPTION OF THE DRAWINGS

The invention will be better understood from a reading of the following description of embodiments, with reference to the accompanying drawings, in which:

FIG. 5 is a fragmentary cross-sectional view of a casing with bellows comprising two regions of helicoidal windings of reverse pitch according to a modification of the invention.

DETAILED DESCRIPTION OF THE INVENTION

As mentioned above, the invention has essentially for its object a process for the production of a casing 1 with protective bellows 2 for an extensible or flexible coupling device, in particular for a transmission device. This casing 1 with bellows 2, 2A, whose applications will not be described in greater detail hereafter, is constituted by a tubular body open at each of its ends and whose wall, arranged about an axis XX', is, between said ends, undulant over at least a portion of its length to delimit a plurality of bellows 2, 2A, each fold corresponding to a bellows. The ends of this body, of generally different dimensions, constitute a section 3A, 3B for securement to the transmission device. Generally, in the condition mounted on the transmission device, the securement sections of the casing are fixed to the device by means of collars, rings or the like. The folds of the body, and in particular the summit of the folds, constituting the rib of the bellows, describe a helix which extends from one securement section 3A to another securement section 3B about a longitudinal axis of the body. At least one portion of these folds, adapted to constitute the bellows, is shaped so as to form so-called radial bellows 2. Thus, the flanks of said bellows extend each time in a manner substantially perpendicular to the longitudinal axis of said body.

Figure 4:
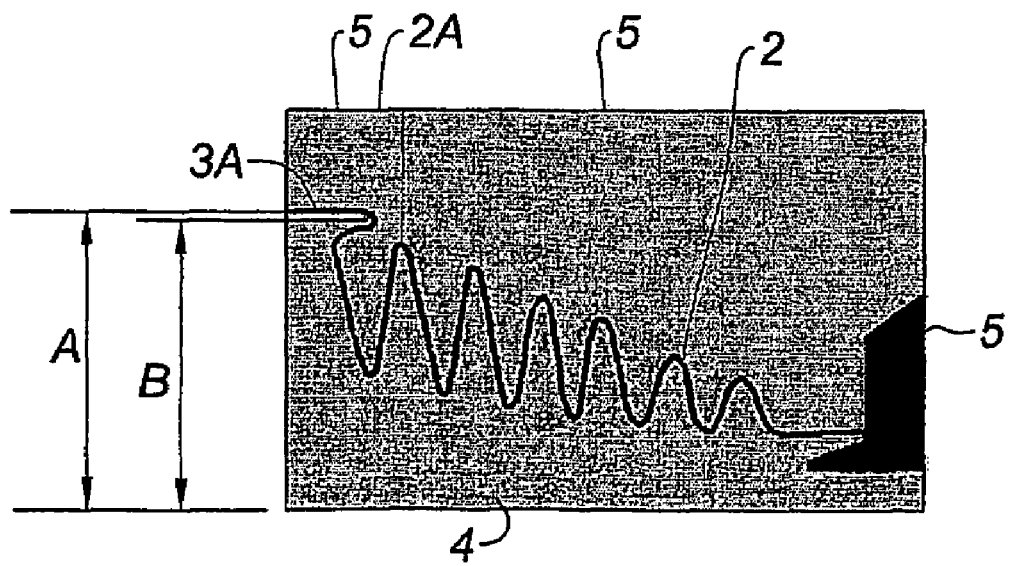
FIG. 4 is a longitudinal half-section of the tool required for molding a casing with bellows according to FIG. 3.

To permit the production of such a casing with protective bellows in particular radial, there is used, as shown in FIG. 4, a tool constituted on the one hand by a hollow mold 5, formed for example of two half shells or a greater number of elements adapted to be brought together to delimit a closed cavity, and at least one core 4. The half shells or the carcass constituting the hollow mold 5, and the hub or hubs, each have at least one complementary helicoidal screw thread delimiting the molding space. The demolding of the casing 1 is obtained, after opening the hollow mold 5, by relative unscrewing of the casing 1 and the core 4. There is thus obtained a single-piece casing free from an internal axial joint plane. This unscrewing can take place in an entirely automatic manner. The movement permitting unscrewing of the casing 1 from the core 4 is either applied to the core 4 to unscrew the core 4 from the casing 1, or to the casing to unscrew the casing from the core. Preferably, the casing 1 is immobilized in the course of unscrewing of the core 4. Each time, in this case, the portion which is not subjected to a drive movement can be held in position for example by means of a suction device, a clamp or the like. In conclusion, the casing and/or the hub comprises or comprise at least one region adapted either to absorb a mechanical couple during unscrewing, or permit a blocking in rotation. This zone can be defined by diametrically opposite ears disposed on the external periphery of said casing. The casing can also be unscrewed automatically by application of pneumatic pressure, preferably on a portion between the core and the casing. This pneumatic pressure is transmitted by means of at least one channel passing through the molding core.

Generally speaking, the casing 1 is injection molded from a thermoplastic elastomer having a hardness preferably at least equal to a Shore D hardness preferably at least equal to 60.

To permit demolding by unscrewing, there is selected the largest cross-section of the core or cores 4 to have a diameter less than or equal to the section of passage of the securement section 3A of the largest dimension of the casing 1 with bellows 2, 2A. According to the shape of the desired casing, there can be given to the core or cores 4 and to the body of the mold 5 a truncated conical shape. It is also possible to mold the casing 1 with the help of at least two cores 4 each having a helicoidal screw thread of different pitch, even reversed, preferably increasing in the direction of the portion of the core adapted to extend adjacent the section 3A for securement by the largest dimension of the casing 1. To facilitate demolding, the largest cross-section of the first core is less than the smallest section of the second core. There is thus obtained a casing which can be like that shown in FIG. 5 in which the pitches are oriented in opposite direction from one core 4 to another. It is also possible to select a core delimiting the spiral passages of the bellows, of increasing width from the smallest securement cross-section 3B toward the largest securement section 3A. This width can thus develop up to 15% per turn of the screw thread. It will generally increase from 1 to 3% per turn of the screw thread.

Figure 6:
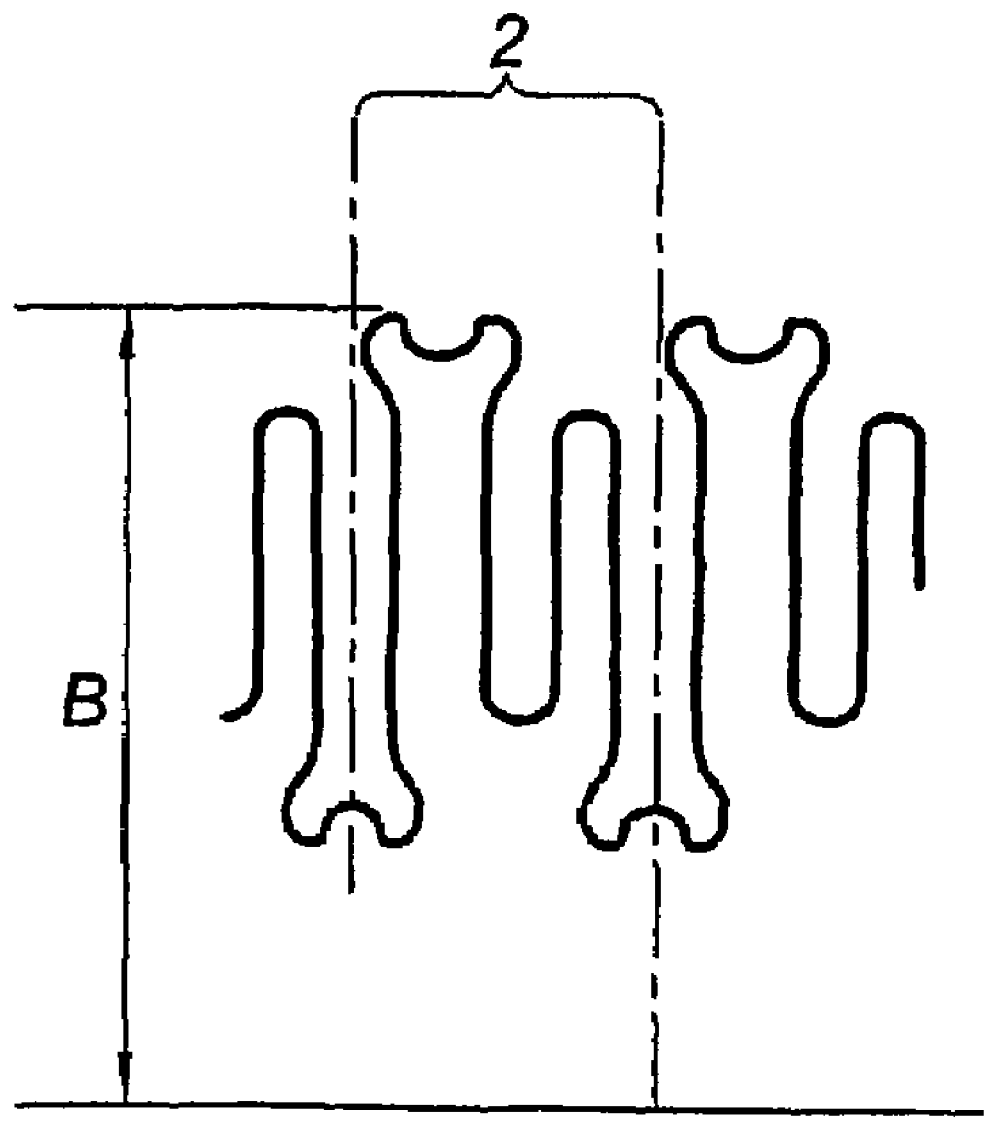
FIG. 6 is a fragmentary longitudinal half-section of a casing with bellows in which each bellows is constituted by multiple spiral passages.

Of course, as a function of the shape of the helicoidal screw threads provided on the core 4 and the mold 5, a large number of shapes can be obtained for the bellows 2 of the casing 1. One embodiment is shown in FIG. 6. The production of such a casing by injection also permits causing to vary as desired the thickness of said walls of the bellows 2. Thus, each bellows can have a reinforced zone, or conversely a thinned zone, at the junction of one bellows with an adjacent bellows in the hollow region between two bellows. It is also possible to provide bellows whose flanks are constituted on one surface to be concave and on the other surface to be convex. This will result in greater clearances of the spiral.

Figure 1:
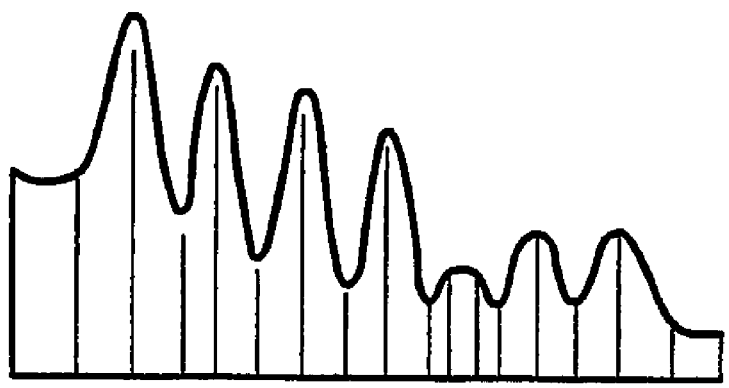
FIGS. 1 and 2 are fragmentary schematic views in cross-section of casings with bellows according to the prior art.
Figure 2:
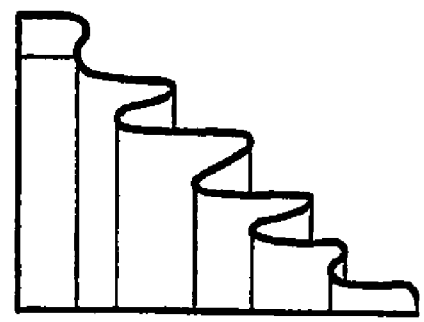
Figure 3:
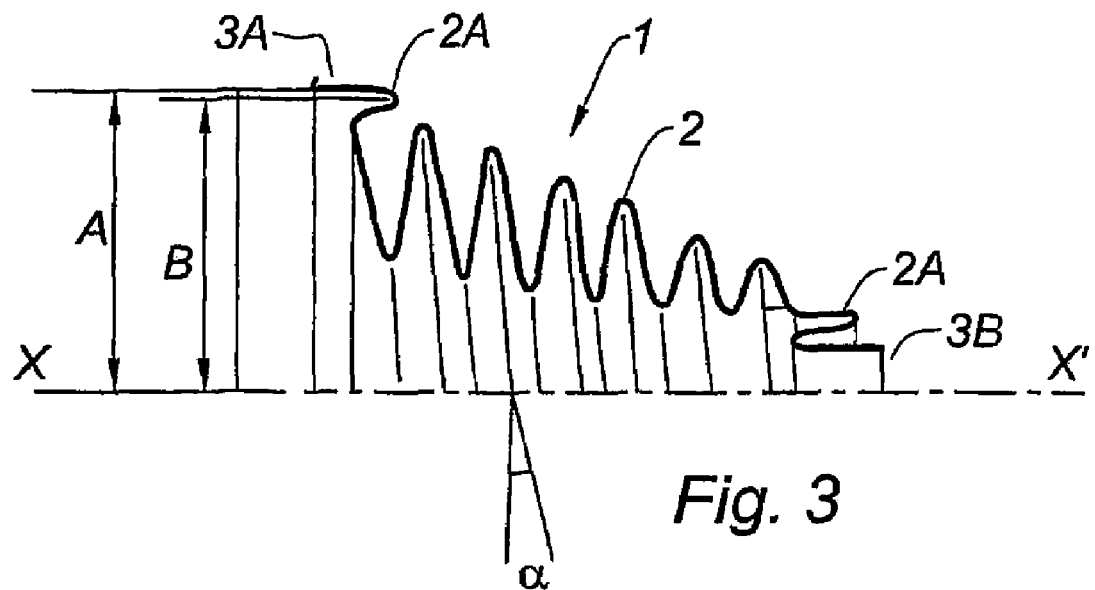
FIG. 3 is a fragmentary partial cross-sectional view of an embodiment of a casing with bellows according to the invention.

The casings 1 with bellows 2, 2A which result from such a production process can have a large number of shapes. Each casing 1 however will have the form of a single-piece body free from an internal axial joint plane. This casing is constituted by a tubular body disposed about an axis XX' and whose ends are open. Each open end is adapted to constitute a section 3A, 3B for securement of the casing 1 to the transmission device. This tubular body of the casing is delimited over at least one portion of its length by an undulated or folded wall. Each fold corresponds to a bellows. The folds or ribs of the bellows between said sections 3A, 3B can thus describe a helix of constant or variable pitch, preferably increasing in the direction of the section 3A of largest size for securement of the casing 1. In the example shown in FIG. 3, the helix has an angle α corresponding substantially to the angle formed by the axis of the fold constituting the radial bellows with an axis perpendicular to the longitudinal axis XX' of the body. These folds can be oriented such that the flanks of the folds extend substantially radially relative to the longitudinal axis of the body of the casing or axially relative to this latter. A combination of the two can also be obtained as shown in particular in FIG. 3. Independently of the number of radial bellows with helicoidal arrangement or of axial bellows 2A, it is fundamental that the section 2A for the largest securement section of the casing 1 have a passage section greater than or equal to the diameter delimited by the summit of the largest bellows. Thus, in the example shown in FIG. 3, reference B corresponds to the radius of the largest bellows whilst reference A corresponds to half the cross-section 3A for securement of the largest in its size. A is thus necessarily greater than B.

According to the forms of the cores 4 and the hollow molds 5 they use, the bellows 2, 2A can be of identical diameter for the production of a cylindrical casing. However, in a preferred arrangement of the invention, the bellows are, from the section 3B of smallest dimension toward the section 3A of largest dimension, of progressive diameter, enscribed in a truncated cone. The radial bellows 2 can be constituted by single or multiple spiral passages. FIG. 6 shows an example in which each bellows 2 is constituted by two successive folds of different shapes. It is to be noted that, to reduce the time of unscrewing of the casing 1 with bellows 2 during the demolding phase, it is preferable to have a large helical pitch. But the greater the pitch, the fewer will be the spirals along a same length of bellows. However, the flexibility of the bellows increases with the number of spirals. Thus, to preserve flexibility by having a large pitch, it is preferable to arrange on the bellows at least one supplemental screw thread of spirals. Each screw thread can thus have its own shape of spiral.

In the case of a bellows having several spiral screw threads, these screw threads can be provided with different sizes of spirals. It is thus possible to have a change in the level of the hollows and the peaks of the spirals. Thus, thanks to the mentioned production process, the casing with bellows can comprise, at the level of the bellows, bellows whose spirals form different helicoidal spirals either at the level of the profile for the production of the spirals, or as to the size of the spirals, namely as to the pitch of the helix, or else as to the orientation of this pitch. Of course, these factors can be combined. There results a large number of possible embodiments for said casings.

In the particular case of the casing with bellows comprising two zones of helicoidal spirals with reverse pitch from one zone to the other, the core is constituted by two elements. The second element of the core corresponding to the region of spirals of reverse pitch unscrews in the opposite direction from the first element during unmolding of the casing. The interest of having on the casing with bellows, regions of spirals of reverse pitch, is to be able to compensate the effect of twisting of one zone by the other zone which has the tendency to twist in the opposite direction. Thus, the helicoidal spirals tend to twist the bellows of the casing when they are stretched or compressed. The effect of twisting the bellows of the casing can be minimized by suitable distribution of the thicknesses of the spirals.

Such a casing 1 with bellows could be disposed in the conventional manner on a transmission mechanism. The securement of the section 3A of largest dimension of the casing 1 with bellows is generally designed to ensure complete sealing. Thus, generally the grease contained within the casing with bellows is projected toward the securement section 3A of great dimension by the action of centrifugal force. The securement of the section 3B of least dimension is provided to be sealed to grease but can let air pass and can permit a slight movement of rotation so as to compensate the twisting of the bellows of the casing. The bellows can thus comprise for this purpose a helicoidal lip. Each securement section 3A, 3B of the casing 1 can also be constituted by at least two bi-injected materials. Thus, a thermoplastic elastomer can be injected within the securement section of largest dimension to obtain better sealing. One of the injected materials can be a material adapted to reflect thermal radiation such that at least a portion of the casing is covered with a reflective coating.

The invention claimed is:

1. A process for the production of a casing (1) with protective bellows (2, 2A) for a transmission device, such as a transmission joint, comprising at least two shafts movable at least one of axially and angularly relative to each other, this casing (1) with bellows (2, 2A), of which at least a portion of the bellows (2) is radial, having at each open end a section (3A, 3B) for securement to the transmission device, the method comprising:
    injecting a thermoplastic or thermoplastic elastomer into a hollow mold (5) formed by two half shells or a greater number of elements adapted to be brought together to delimit a closed cavity and at least one core (4), each mold (5) having at least one complementary helicoidal screw thread delimiting the molding space, and in demolding the formed casing (1) by relative unscrewing of the casing (1) after opening the hollow mold and the core (4) so as to obtain a single-piece casing,
    wherein the largest cross-section of the core or cores (4) is arranged have a diameter less than or equal to the passage section of the securement section (3A) of largest dimension of the casing (1) with bellows (2, 2A), and
    the core or cores (4) and the body of the mold (5) have a truncated conical shape.

2. The process for the production of a casing (1) with protective bellows (2, 2A) according to claim 1, further comprising:
    molding the casing (1) with at least two cores (4) each having a helicoidal screw thread of different pitch, preferably increasing in the direction of the portion of the core adapted to extend to adjacent the securement section (3A) of largest size of the casing (1).

3. A process for the production of a casing (1) with protective bellows (2, 2A) for a transmission device, such as a transmission joint, comprising at least two shafts movable at least one of axially and angularly relative to each other, this casing (1) with bellows (2, 2A), of which at least a portion of the bellows (2) is radial, having at each open end a section (3A, 3B) for securement to the transmission device, the method comprising:

injecting a thermoplastic or thermoplastic elastomer into a hollow mold (5) formed by two half shells or a greater number of elements adapted to be brought together to delimit a closed cavity and at least one core (4), each mold (5) having at least one complementary helicoidal screw thread delimiting the molding space, and in demolding the formed casing (1) by relative unscrewing of the casing (1) and the core (4) so as to obtain a single-piece casing, wherein the largest cross-section of the core or cores (4) is arranged have a diameter less than or equal to the passage section of the securement section (3A) of largest dimension of the casing (1) with bellows (2, 2A), and the core or cores (4) and the body of the mold (5) have a truncated conical shape.

* * * * *